United States Patent
Kazyak et al.

(10) Patent No.: US 12,017,547 B2
(45) Date of Patent: Jun. 25, 2024

(54) VEHICLE HAVING A CARGO POD

(71) Applicant: Lear Corporation, Southfield, MI (US)

(72) Inventors: David Kazyak, Southfield, MI (US); Paul Severinski, Southfield, MI (US); Anthony Mollica, Southfield, MI (US); Mark Weaver, Southfield, MI (US); Jeff Jones, Southfield, MI (US)

(73) Assignee: LEAR CORPORATION, Southfield, MI (US)

( * ) Notice: Subject to any disclaimer, the term of this patent is extended or adjusted under 35 U.S.C. 154(b) by 153 days.

(21) Appl. No.: 17/555,909

(22) Filed: Dec. 20, 2021

(65) Prior Publication Data

US 2023/0191923 A1 Jun. 22, 2023

(51) Int. Cl.
| | | |
|---|---|---|
| *B60L 50/60* | (2019.01) | |
| *B60K 1/04* | (2019.01) | |
| *B60L 1/00* | (2006.01) | |
| *B60L 53/00* | (2019.01) | |
| *B60P 1/00* | (2006.01) | |

(52) U.S. Cl.
CPC ............ *B60L 50/66* (2019.02); *B60K 1/04* (2013.01); *B60L 1/00* (2013.01); *B60L 53/00* (2019.02); *B60P 1/00* (2013.01); *B60K 2001/0405* (2013.01)

(58) Field of Classification Search
CPC .............. B60L 53/00; B60L 1/00; B60P 1/00
See application file for complete search history.

(56) References Cited

U.S. PATENT DOCUMENTS

| | | | | |
|---|---|---|---|---|
| 5,775,227 | A  * | 7/1998 | Mullen ................. | B30B 15/304 104/244 |
| 8,920,082 | B2 * | 12/2014 | Bryant ..................... | B60P 3/07 410/4 |
| 9,073,499 | B1 * | 7/2015 | Erickson ................. | B60R 11/06 |
| 9,290,100 | B2 | 3/2016 | Wisniewski et al. | |
| 9,358,895 | B2 * | 6/2016 | Avganim ................. | B60K 1/04 |
| 10,300,804 | B2 * | 5/2019 | Salasoo .................... | B60L 53/80 |
| 10,737,580 | B2 * | 8/2020 | Aiuchi ................. | A61G 3/0808 |
| 2018/0170349 | A1 * | 6/2018 | Jobson ..................... | B60L 7/18 |
| 2018/0237086 | A1 * | 8/2018 | Evans ....................... | H02J 7/00 |
| 2020/0086730 | A1 * | 3/2020 | Hara ......................... | B60K 1/04 |
| 2020/0307721 | A1 * | 10/2020 | Patel .................. | G06Q 10/0836 296/24.44 |
| 2020/0369334 | A1 * | 11/2020 | Lee .......................... | B60K 1/04 |
| 2021/0070339 | A1 * | 3/2021 | Delgatty ................. | B60R 25/24 |

FOREIGN PATENT DOCUMENTS

KR 101647867 B1 8/2016

* cited by examiner

*Primary Examiner* — Brian L Swenson
(74) *Attorney, Agent, or Firm* — Brooks Kushman P.C.

(57) ABSTRACT

A vehicle having at least one cargo pod. The cargo pod may be rolled into and out of a cargo area of the vehicle. The cargo pod may include at least one battery. The battery may be selectively connectable to a vehicle power network. The battery may be disposed proximate a base of the cargo pod.

19 Claims, 2 Drawing Sheets

VEHICLE HAVING A CARGO POD

TECHNICAL FIELD

This relates to a vehicle having one or more cargo pods that can be electrically connected to a vehicle power network.

BACKGROUND

A quick loading and unloading battery system for a vehicle is disclosed in U.S. Pat. No. 9,358,895.

SUMMARY

In at least one configuration a vehicle is provided. The vehicle may include a vehicle power network, a cargo area, a power network interface, and a cargo pod. The vehicle power network may include a vehicle battery that may be disposed on the vehicle. The power network interface may be disposed in the cargo area. The cargo pod may include a base, a frame, a set of wheels, and a battery. The frame extend upward from the base and may include a shelf that is adapted to support a package. The set of wheels may extend below the base and may permit the cargo pod to be rolled into and out of the cargo area. The battery may be disposed proximate the base and may be selectively connectable to the vehicle power network.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
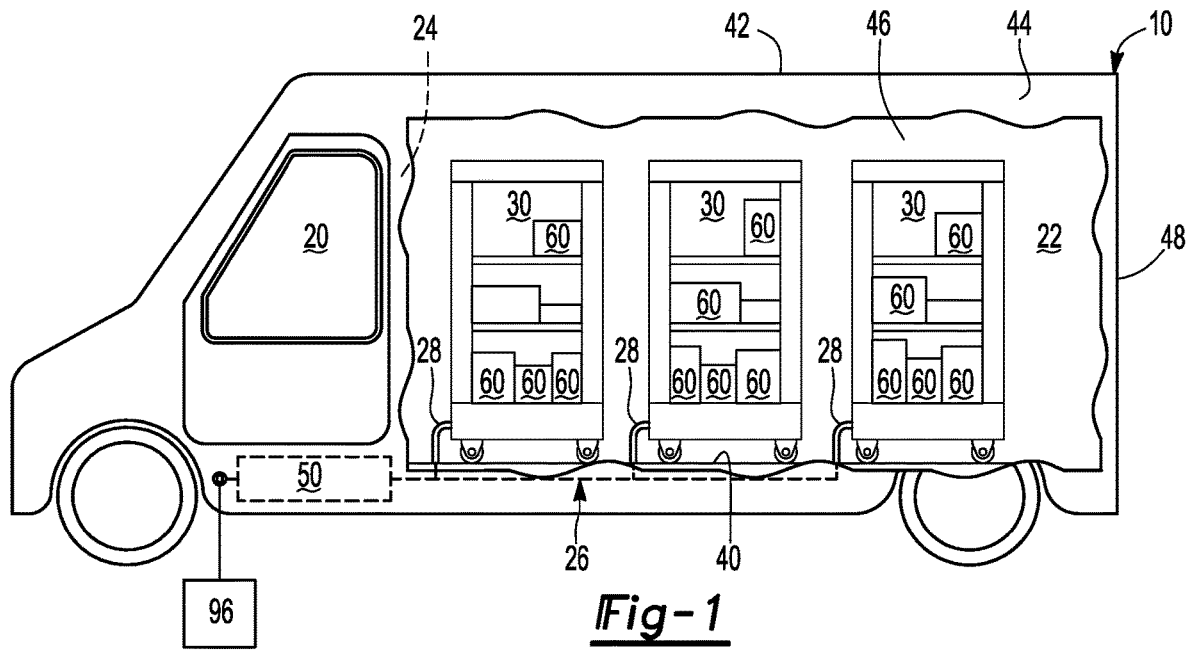
FIG. 1 is a fragmentary side view of an example of a vehicle with cargo pods.

Referring to FIG. 1, an example of a cargo carrying vehicle or delivery vehicle 10 is shown. The delivery vehicle 10 may be a vehicle of any suitable type, such as a land vehicle like a truck or van.

In at least one configuration, the delivery vehicle 10 may include a passenger compartment 20, a cargo area 22, a bulkhead 24, a vehicle power network 26, and a power network interface 28.

The passenger compartment 20 may be disposed near the front or front end of the delivery vehicle 10, which is located to the left from the perspective shown in FIG. 1. In at least one configuration, the passenger compartment 20 may have a seat for receiving a driver or passenger of the delivery vehicle 10.

The cargo area 22 may be disposed behind the passenger compartment 20. The cargo area 22 may receive one or more cargo pods 30 as will be discussed in more detail below.

The cargo area 22 may be defined by or bounded by multiple sides of the delivery vehicle 10, such as a floor 40, a roof 42, a first side wall 44, a second side wall 46, and a rear wall 48, which may separate the cargo area 22 from the surrounding environment outside the delivery vehicle 10. In addition, the cargo area 22 may be further bounded by the bulkhead 24.

The floor 40, which may also be referred to as a floor pan, may define the bottom of the cargo area 22. The floor 40 may be disposed on or may be supported by a frame or chassis of the delivery vehicle 10. The floor 40 may include one or more rails to which a cargo pod 30 may be selectively coupled to inhibit movement of a cargo pod 30 when the cargo pod 30 is disposed in the cargo area 22.

The roof 42 may define the top of the cargo area 22. The roof 42 may be disposed above the floor 40 and may be spaced apart from the floor 40.

The first side wall 44 may extend in a generally vertical direction from the floor 40 to the roof 42. In addition, the first side wall 44 may extend in a longitudinal direction between the passenger compartment 20 and the rear wall 48. For instance, the first side wall 44 or a portion thereof may extend substantially parallel to a longitudinal center plane of the delivery vehicle 10. The term "substantially parallel" as used herein means the same as or very close to parallel and includes features or axes that are within ±2° of being parallel each other. The longitudinal center plane may be disposed proximate the center of the delivery vehicle 10 and may extend in a longitudinal direction, which may be a direction that extends between the front end and the rear end of the delivery vehicle 10.

The second side wall 46 may be disposed opposite the first side wall 44 and may be spaced apart from the first side wall 44. The second side wall 46 may extend in a generally vertical direction from the floor 40 to the roof 42. In addition, the second side wall 46 may extend in a longitudinal direction between the passenger compartment 20 and the rear wall 48. The second side wall 46 or portion thereof may extend substantially parallel to the longitudinal center plane.

It is contemplated that the first side wall 44, the second side wall 46, or both may include one or more side doors that may facilitate access to the cargo area 22.

The rear wall 48 may be disposed proximate the rear of the delivery vehicle 10. The rear wall 48 may extend in a generally vertical direction from the floor 40 to the roof 42. In addition, the rear wall 48 may extend in a lateral direction from the first side wall 44 to the second side wall 46. In at least one configuration, the rear wall 48 may include one or more rear doors that may facilitate access to the cargo area 22. The rear wall 48 may be spaced apart from and may be disposed opposite the bulkhead 24.

The bulkhead 24 may separate the passenger compartment 20 from the cargo area 22. As such, the bulkhead 24 may be disposed rearward of the passenger compartment 20 and may be disposed at the front of the cargo area 22. The bulkhead 24 may be a fixed bulkhead that may be stationary. The bulkhead 24 may extend in a generally vertical direction between the floor 40 and the roof 42. For instance, the bulkhead 24 may extend from the floor 40 toward or to the roof 42. In addition, the bulkhead 24 may extend in a lateral direction between the first side wall 44 and the second side wall 46. In at least one configuration, the bulkhead 24 may include one or more openings. An opening may be sized to permit the driver to fit through the opening, a package to fit through the opening, or both.

The vehicle power network 26 may provide electrical energy to electrical components of the delivery vehicle 10. In at least one configuration, the vehicle power network 26 may include a vehicle battery 50 that may be disposed on the delivery vehicle 10. The vehicle power network 26 may provide electrical energy from the vehicle battery 50 to power or facilitate operation of various electrical components of the delivery vehicle 10. It is also contemplated that the vehicle power network 26 may provide electrical energy to the vehicle battery 50 to charge the vehicle battery 50. In a vehicle having an electric or hybrid electric powertrain, energy from the vehicle battery 50 may be used to propel the delivery vehicle 10 and energy may be recovered to charge the battery via a regenerative braking system.

The power network interface 28 may be disposed in the cargo area 22. The power network interface 28 may be used to electrically connect the vehicle power network 26 to one or more batteries that may be provided with a cargo pod 30. The power network interface 28 may have any suitable configuration. In at least one configuration, the power network interface 28 may be configured as a cable.

The cable may be hardwired to the delivery vehicle 10 and may have an electrical connector that may interface with or plug into a corresponding electrical connector that may be provided with the cargo pod 30. Alternatively, the cable may be hardwired to the cargo pod 30 and may have an electrical connector that may interface with or plug into a corresponding electrical connector that may be provided in the cargo area 22 of the delivery vehicle 10. In another configuration, the cable may not be hardwired but instead may have electrical connectors at each end. One electrical connector may interface with or plug into a corresponding electrical connector of the cargo pod 30 while another electrical connector may interface with or plug into a corresponding electrical connector that may be provided in the cargo area 22. The cable may be separated from the floor 40 and may not be provided with or plug into the floor 40 of the cargo area 22 in one or more configurations. For instance, the cable may extend from a wall that defines the cargo area 22, such as the first side wall 44 or the second side wall 46.

Figure 2:
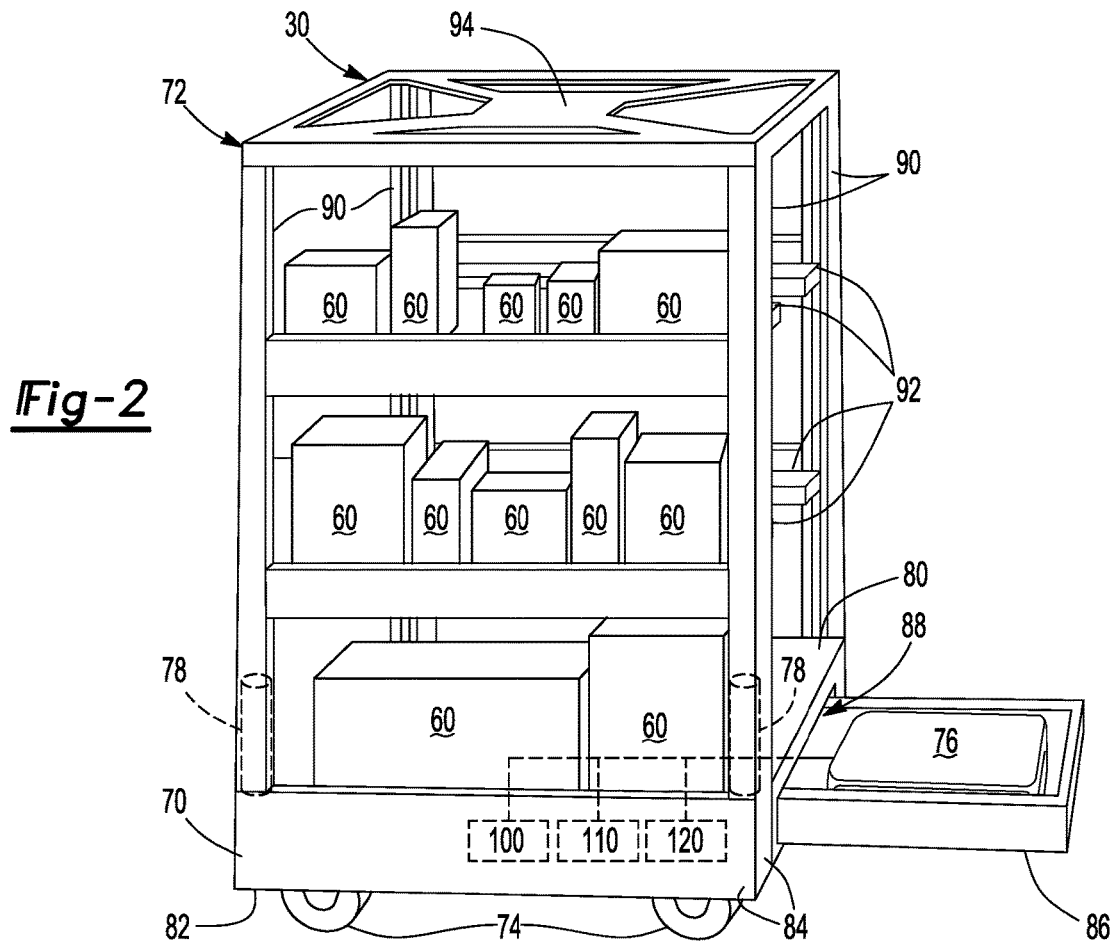
FIGS. 2 and 3 are perspective views of an example of a cargo pod having a battery.
Figure 3:
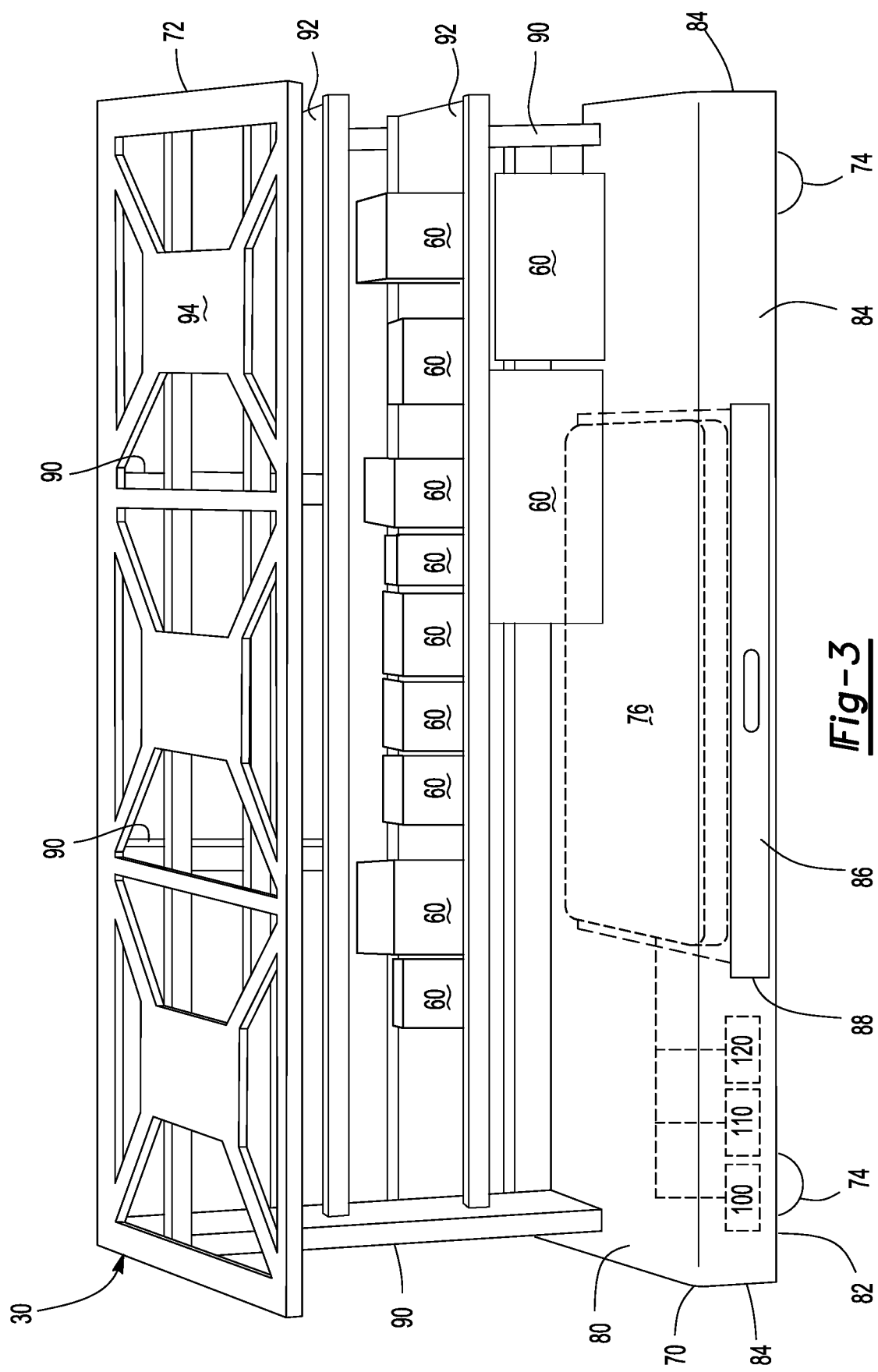

One or more cargo pods 30 may be positionable in the cargo area 22 and may be removable from the cargo area 22. The cargo pod 30 may receive cargo, such as one or more packages 60 that are to be delivered by the delivery vehicle 10. For clarity, only some of the packages 60 are labeled in the figures. In at least one configuration and as is best shown in FIGS. 2 and 3, the cargo pod 30 may include a base 70, a frame 72, a set of wheels 74, and a battery 76. Optionally, the cargo pod 30 may include a second battery 78.

The base 70 may support the components of the cargo pod 30. For instance, the base 70 may be disposed near the bottom of the cargo pod 30 and may be supported by the set of wheels 74. The base 70 may have any suitable configuration. For instance, the base 70 may have a generally square or rectangular shape. In at least one configuration, the base 70 may include a top side 80, a bottom side 82, and one or more lateral sides 84. The base 70 may also include a drawer 86.

The top side 80 may face away from the set of wheels 74. The top side 80 may be a generally flat horizontal surface and may be configured to support one or more packages 60.

The bottom side 82 may be disposed opposite the top side 80. As such, the bottom side 82 may face downward. The bottom side 82 may be spaced apart from the top side 80. In at least one configuration, the bottom side 82 or a portion thereof may be disposed substantially parallel to the top side 80.

One or more lateral sides 84 may extend between the top side 80 and the bottom side 82. For instance, a lateral side 84 may extend from the top side 80 to the bottom side 82. In the configuration shown in FIGS. 2 and 3, four lateral sides 84 are provided. The lateral sides 84 may be arranged in pairs that may be disposed opposite each other and each lateral side 84 may extend between two other lateral sides 84. The lateral sides 84 may extend in a generally vertical direction and may be disposed substantially perpendicular to the top side 80, the bottom side 82, or both. In at least one configuration, a lateral side 84 may define a drawer opening 88 that may receive the drawer 86. The drawer opening 88 may be located in an intermediate region of a lateral side 84 such that the drawer opening 88 is spaced apart from the corners of the base 70 and does not extend beneath a post 90. The drawer opening 88 may also be disposed between at least two members of the set of wheels 74.

The drawer 86 may slide into and out of the base 70. For instance, the drawer 86 may be slidable in the drawer opening 88 between an open position and a closed position. An example of an open position shown in FIG. 2 while an example of a closed position shown in FIG. 3. The drawer 86 may extend through the drawer opening 88 and may be disposed between the top side 80 and the bottom side 82 of the base 70. The battery 76 may be received in the drawer 86. In at least one configuration, the drawer 86 may have a bottom panel upon which the battery 76 may be disposed and may have one or more side panels that extend upward from the bottom panel to define a drawer cavity that may receive the battery 76.

The frame 72 may extend from the base 70. In at least one configuration, the frame 72 may include a set of posts 90 and one or more shelves 92.

The set of posts 90 may extend upward from the base 70. For instance, a post 90 may extend in a generally vertical direction and may be disposed substantially perpendicular to the top side 80 of the base 70. In at least one configuration, a post 90 may extend to a top panel 94 that may be disposed opposite the base 70. The posts 90 may be spaced apart from each other and may be arranged such that a post 90 is positioned at each corner of the base 70 as shown in FIG. 2 or at some corners of the base 70 as shown in FIG. 3. It is also contemplated that posts 90 may be positioned proximate a lateral side 84 of the base 70 at locations other than a corner as shown in FIG. 3. In at least one configuration and as is best shown with reference to FIG. 2, a post 90 may have a hollow tubular structure that may define a cavity that receives a second battery 78 as will be discussed in more detail below. A post 90 may support one or more shelves 92.

A shelf 92 may be configured to support one or more packages 60. A shelf 92 may extend from one or more posts 90. For instance, a shelf 92 may be cantilevered from some but not all of the members of the set of posts 90 as shown in FIG. 2. Alternatively, a shelf 92 may extend from all members of the set of posts 90 as shown in FIG. 3. It is also contemplated that one or more shelves in the configuration shown in FIG. 2 may extend from all four posts 90.

The set of wheels 74 may facilitate movement of the cargo pod 30. For instance, the wheels 74 may extend below the base 70 or downward from the base 70 and may permit the cargo pod 30 to be rolled into the cargo area 22 and out of the cargo area 22. One or more wheels 74 may be lockable to inhibit movement of the cargo pod 30. It is also contemplated that the cargo pod 30 may include a latch mechanism that may be selectively coupled to the floor 40 or a rail that is provided with the floor 40 to secure the cargo pod 30 and the cargo area 22.

The battery 76 may store electrical energy. The battery 76 may have any suitable configuration. For instance, the battery 76 may include one or more cells that may be electrically connected, such as in series. The battery 76 may be of any suitable type, such as a lithium-ion battery.

The battery 76 may be disposed proximate the base 70 of the cargo pod 30. In at least one configuration, the battery 76 may be disposed inside the base 70 when in use. Providing the battery 76 inside of the base 70 may help protect the battery 76 from contaminants or damage and may help secure the battery 76. For instance, the battery 76 may be disposed in the drawer 86. In at least one configuration, the battery 76 may be disposed between the top side 80 and a bottom side 82 of the base 70. Moreover, the battery 76 may be spaced apart from the top side 80, the bottom side 82, or both to help further protect the battery 76 in the event that a side of the base 70 is dented or deformed. Providing the battery 76 in the base 70 may help lower the center of gravity of the cargo pod 30 and inhibit tilting or tipping of the cargo pod 30.

The battery 76 may be selectively connectable to the vehicle power network 26. For instance, the cargo pod 30 may be electrically connectable to the vehicle power network 26 when the cargo pod 30 is disposed in the cargo area 22.

The battery 76 may provide energy to the delivery vehicle 10, receive energy from the delivery vehicle 10, or both when the battery 76 is connected to the vehicle power network 26. For instance, the battery 76 may provide energy to the delivery vehicle 10 to propel the delivery vehicle 10 or provide energy to an electrical device that is connected to the vehicle power network 26. Energy to propel the delivery vehicle 10 may be provided separately from energy provided by the vehicle battery 50 or in conjunction with energy provided by the vehicle battery 50. The battery 76 may provide electrical energy to the vehicle to propel the delivery vehicle 10 when a state of charge of the vehicle battery 50 is less than a predetermined state of charge. In at least one configuration, the predetermined state of charge may be less than the state of charge of the battery 76.

The delivery vehicle 10 may provide electrical energy to the battery 76 to charge the battery 76. Moreover, the vehicle battery 50 and one or more batteries associated with the cargo pod 30, such as batteries 76 and/or 78 may be charged simultaneously. For instance, in a delivery vehicle 10 having an electric drivetrain, one or more batteries associated with the cargo pod 30 may be charged when the cargo pods are in the cargo area 22, are electrically connected to the vehicle power network 26, and the vehicle battery 50 is being charged by an external power source 96, which is illustrated in FIG. 1. It is also contemplated that the vehicle power network 26 may use electrical energy from the battery 76 to propel the delivery vehicle 10 before using electrical energy from the vehicle battery 50 to propel the delivery vehicle 10 to reduce or avoid depletion of the vehicle battery 50.

The battery 76 may provide power to various features or components that may be provided with the cargo pod 30. For instance, the battery 76 may provide power to a material handling component 100 that is provided with the cargo pod 30. A material handling component 100 may move one or more packages 60 with respect to the cargo pod 30 to facilitate positioning and/or retrieval of a package 60. Some examples of material handling components 100 include a conveyor, driven rollers, or a package pusher that may move a package 60 along a shelf 92.

The battery 76 may provide power to a mobility system 110 of the cargo pod 30. A mobility system 110 may facilitate movement of the cargo pod 30. For instance, the mobility system 110 may include one or more electrical motors that may rotate one or more members of the set of wheels 74, steer one or more members of the set of wheels 74, or both.

The battery 76 may provide power to a data communication system 120 of the cargo pod 30. The data communication system 120 may provide information regarding the cargo pod 30, its cargo, or both. Information regarding the cargo pod 30 may include cargo pod identification information, cargo pod location information, and operating status information. Operating status information may include information regarding a battery, such as the state of charge of the battery 76 and/or the second battery 78, the operational state of a material handling component 100, the operational state of the mobility system 110, diagnostic information, and the like. Information regarding the contents of the cargo pod 30 may include package identification information, package delivery point information, package location information (e.g., where the package 60 is located on the cargo pod 30), and the like.

Referring to FIG. 2, the second battery 78 may be selectively connectable to the vehicle power network 26, the battery 76, or both. The second battery 78 may be received inside a post 90 as previously discussed. A cap, cover, or door may be provided with a post 90 to facilitate access to the second battery 78. The second battery 78 may be electrically connected to the battery 76 and may be selectively connectable to the vehicle power network 26 in the same manner as the battery 76 as previously described. It is also contemplated that the second battery 78 may not be connectable to the vehicle power network 26 but instead may be dedicated to providing power or energy to features or components of the cargo pod 30 (e.g., the material handling component 100, mobility system 110, data communication system 120), thereby helping ensure that the second battery 78 is not depleted by providing power to the delivery vehicle 10. It is also contemplated that the second battery 78 may be connectable to the vehicle power network 26 to charge the second battery 78 but not to provide power to the delivery vehicle 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   a vehicle power network comprising a vehicle battery disposed on the vehicle;
   a cargo area defined in the vehicle;
   a power network interface that is disposed in the cargo area; and
   a cargo pod that is removable from the cargo area, the cargo pod comprising:
   a base;
   a frame that extends upward from the base defining a cavity configured to receive packages; and
   a set of wheels that extend below the base and that permit the cargo pod to be rolled into and out of the cargo area,
   wherein the cargo pod is removably securable within the cargo area and connectable to the vehicle power network via the power network interface to supply power to the cargo pod, at least one of a battery of the cargo pod and the vehicle battery is configured to supply electrical energy to propel the vehicle, and the vehicle power network uses electrical energy from the battery to propel the vehicle before using electrical energy from the vehicle battery to propel the vehicle.

2. The vehicle of claim 1,
wherein the battery is disposed proximate the base and the battery is selectively connectable to the vehicle power network.

3. The vehicle of claim 1, wherein the battery is disposed in a drawer that slides into and out of the base.

4. The vehicle of claim 3, wherein the drawer is disposed between a top side and a bottom side of the base, and the drawer extends through an opening that is disposed in a lateral side of the base.

5. The vehicle of claim 4, wherein the lateral side extends between the top side and the bottom side.

6. The vehicle of claim 4, wherein the drawer and the opening are disposed between two members of the set of wheels.

7. The vehicle of claim 1, wherein the frame includes a set of posts that extend upward from the base.

8. The vehicle of claim 7, wherein the cargo pod further comprises a top surface above the posts, defining a top of the cavity.

9. The vehicle of claim 8, wherein the cargo pod further comprises a latch mechanism configured to selectively secure the cargo pod with a floor of the vehicle.

10. The vehicle of claim 1, wherein the cargo pod is electrically connectable to the vehicle power network with a cable when the cargo pod is disposed in the cargo area.

11. The vehicle of claim 1, wherein the battery provides electrical energy to the vehicle to propel the vehicle when a state of charge of the vehicle battery is less than a predetermined state of charge.

12. The vehicle of claim 1, wherein the vehicle provides electrical energy to the battery.

13. The vehicle of claim 1, wherein the battery provides power to a material handling component of the cargo pod that moves the packages with respect to the cargo pod.

14. The vehicle of claim 1, wherein the battery provides power to at least one of a mobility system and a data communication system of the cargo pod.

15. The vehicle of claim 14, wherein the mobility system of the cargo pod moves the cargo pod within the cargo area to facilitate positioning of the packages.

16. The vehicle of claim 1, wherein the battery of the cargo pod is charged when the battery is electrically connected to the vehicle power network and the vehicle battery is being charged by an external power source.

17. A cargo pod, comprising:
a base;
a set of wheels that extend below the base and that permit the cargo pod to be rolled into and out of a vehicle, wherein the cargo pod is removably securable within the vehicle; and
a first battery that is disposed proximate the base,
wherein at least one of the first battery and a second battery of the vehicle is configured to supply electrical energy to propel the vehicle, and when the first battery supplies electrical energy to the vehicle to propel the vehicle, a state of charge of the second battery is less than a predetermined state of charge.

18. A vehicle, comprising:
a vehicle power network comprising a first battery disposed on the vehicle;
a cargo area defined in the vehicle; and
a cargo pod that is demountable from the cargo area, wherein the cargo pod comprises:
a base;
a set of wheels configured to permit the cargo pod to be rolled into and out of the cargo area; and
a second battery
wherein at least one of the first battery and the second battery is configured to supply electrical energy to propel the vehicle, and wherein the second battery is charged when the second battery is electrically connected to the vehicle power network and the first battery is being charged by an external power source.

19. The vehicle of claim 18, wherein the cargo pod further comprises a third battery that is selectively connectable to at least one of the vehicle power network and the second battery.

* * * * *